United States Patent [19]
Köhler et al.

[11] Patent Number: 5,554,716
[45] Date of Patent: Sep. 10, 1996

[54] USE OF HYDROGENATED ABIETIC ACID AS A CHAIN TERMINATOR FOR THE PRODUCTION OF POLYCARBONATES AND POLYESTER CARBONATES

[75] Inventors: Burkhard Köhler; Wolfgang Ebert, both of Krefeld; Klaus Horn, Dormagen; Rolf Dhein, Krefeld, all of Germany

[73] Assignee: Bayer Aktiengesellschaft, Leverkusen, Germany

[21] Appl. No.: 417,821

[22] Filed: Apr. 6, 1995

[30] Foreign Application Priority Data

Apr. 18, 1994 [DE] Germany ................... 44 13 397.9

[51] Int. Cl.[6] .................................................. C08G 64/00
[52] U.S. Cl. ...................... 528/196; 525/146; 528/198
[58] Field of Search ....................... 528/196, 198; 525/146

[56] References Cited

U.S. PATENT DOCUMENTS 4,358,563  11/1982  Quinn et al. ............... 525/146

OTHER PUBLICATIONS

"Encyclopedia of Polymer Science and Engineering" pp. 649–655 (2nd edition) vol. 11, (1988).

*Primary Examiner*—James J. Seidleck
*Assistant Examiner*—Terressa M. Mosley
*Attorney, Agent, or Firm*—Connolly and Hutz

[57] ABSTRACT

The invention relates to the use of hydrogenated abietic acid as a chain terminator for the production of polycarbonates and polyester carbonates and to the polycarbonates and polyester carbonates obtainable in accordance with the invention.

12 Claims, No Drawings

USE OF HYDROGENATED ABIETIC ACID AS A CHAIN TERMINATOR FOR THE PRODUCTION OF POLYCARBONATES AND POLYESTER CARBONATES

This invention relates to the use of hydrogenated abietic acid as a chain terminator for the production of thermoplastic aromatic polycarbonates.

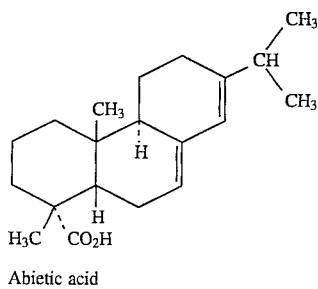

Abietic acid (See, for example, Fieser and Fieser, Organische Chemie, Verlag Chemie GmbH, Weinheim 1965, page 1564)

Hydrogenated abietic acid, i.e. dihydro- and tetrahydroabietic acid, is also known and is obtained by hydrogenation of colophony (see, for example, Ullmanns Encyclopädie der technischen Chemie, Verlag Chemie Weinheim, 4th Edition, Vol. 12, pages 529 to 536, more particularly page 532).

The polycarbonates obtainable in accordance with the invention terminated by hydrogenated abietate groups corresponding to formula (I):

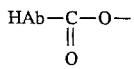  (I)

in which HAb is the hydrogenated residue corresponding to formula (Ia) and/or formula (Ib):

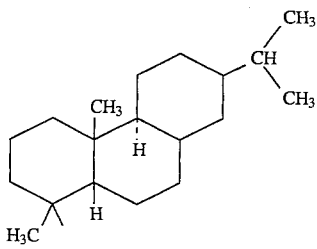 (Ia)

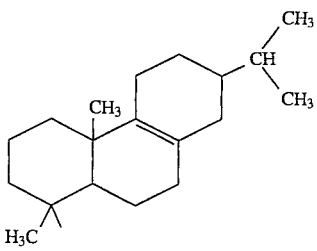 (Ib)

have an elevated glass temperature and, hence, show improved heat resistance and improved toughness at low temperatures.

Abietate-terminated polycarbonates are known from U.S. Pat. No. 4,358,563. They show better compatibility with polyethylene. For this reason, U.S. Pat. No. 4,358,563 also describes above all blends of the abietate-terminated polycarbonates with polyolefins. However, the abietate-terminated polycarbonates are yellow brown in color and are not heat-resistant.

The production of the thermoplastic aromatic polycarbonates using hydrogenated abietic acid as chain terminator may be carried out by known methods for the synthesis of polycarbonates, i.e. by the interfacial process, by the homogeneous phase process (the so-called pyridine process) and by the melt transesterification process.

Accordingly, the present invention also relates to a process for the production of thermoplastic aromatic polycarbonates from diphenols, carbonate donors, chain terminators and optionally branching agents by the known interfacial, homogeneous phase or melt transesterification method, characterized in that hydrogenated abietic acid, preferably tetrahydroabietic acid, is used as chain terminator in quantities of 0.6 mole-% to 12 mole-% and preferably in quantities of 2 mole-% to 7 mole-%, based on moles of diphenols used.

The polycarbonates obtainable in accordance with the invention have molecular weights $\overline{M}w$ (weight average, as determined via the relative solution viscosity in $CH_2Cl_2$ at 25° C. and at a concentration of 0.5 g per 100 ml $CH_2Cl_2$) in the range from 10,000 to 200,000 and preferably in the range from 30,000 to 70,000.

Accordingly, the present invention also relates to the aromatic polycarbonates obtainable by the process according to the invention with average molecular weights $\overline{M}w$ (weight average determined as described above) in the range from 10,000 to 200,000 and preferably in the range from 30,000 to 70,000.

The present invention also relates to thermoplastic, aromatic, optionally branched polycarbonates with weight average molecular weights $\overline{M}w$ (determined as described above) in the range from 10,000 to 200,000 and preferably in the range from 30,000 to 70,000 terminated by the groups corresponding to formula (I).

Diphenols suitable for the production of the thermoplastic polycarbonates in accordance with the invention are, in principle, any diphenols of which the OH groups react to form polycarbonate under the conditions of the interfacial process or the homogeneous phase process or the melt transesterification process, i.e. for example are not prevented from reacting by steric hindrance or other molecular factors, and which otherwise are either unsubstituted or only bear substituents which are inert under the polycarbonate production conditions mentioned above, such as for example alkyl substituents or halogen substituents.

Suitable diphenols are, in particular, diphenols corresponding to formula (II):

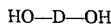 (II)

in which

—D— is a two-bond $C_{6-50}$ and preferably $C_{12-45}$ arylene group which may be mononuclear or polynuclear, may be attached by a polynuclear linear bond or by a polynuclear fused bond and may contain hetero atoms and also C-containing hetero segments as binding links, these carbon atoms or hetero segments not being included among the 50 carbon atoms of the diphenols (II) mentioned above.

The diphenols corresponding to formula (II) may be unsubstituted or may bear the inert substituents mentioned above, i.e. for example the halogen substituents mentioned above or the alkyl substituents mentioned above, the carbon atoms of potential substituents, i.e. for example of the alkyl substituents, being included among the 50 carbon atoms of the diphenols (II) mentioned above.

Suitable diphenols (II) are, for example, hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, α,α'-bis-(hydroxyphenyl)-diisopropylbenzenes and nucleus-alkylated and nucleus-halogenated compounds thereof.

These and other suitable diphenols are described, for example, in U.S. Pat. No. 3,028,365, 2,999,835, 3,148,172, 2,991,273, 4,982,014, 3,271,367 and 2,999,846; in DE-OS 1 570 703, 2 063 050, 2 036 052, 2 211 956; in FR-PS 1 561 518 and in the book by H. Schnell entitled "Chemistry and Physics of Polycarbonates", Interscience Publishers, New York 1964 and also in published Japanese patent applications 62039/1986, 62040/1986 and 105550/1986.

Preferred diphenols are, for example 4,4'-dihydroxydiphenyl, 2,2-bis-(4-hydroxyphenyl)-propane, 2,4-bis-(4-hydroxyphenyl)- 2-methylbutane, 1,1-bis-(4-hydroxyphenyl)cyclohexane, α,α'-bis-(4-hydroxyphenyl)-p-diisopropylbenzene, 2,2-bis-(3-methyl-4-hydroxyphenyl)-propane, 2,2-bis-( 3-chloro-4-hydroxyphenyl)-propane, bis-(3,5-dimethyl- 4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)cyclohexane, α,α'-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)propane and 1,1-bis-(4-hydroxyphenyl)-3,3,5-trimethyl cyclohexane (TMC bisphenol).

Particularly preferred diphenols are, for example, 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethyl cyclohexane (TMC bisphenol).

Mixtures of the diphenols mentioned above may also be used.

In a preferred embodiment, therefore, the present invention relates to polycarbonates with $\overline{M}w$ values (weight average molecular weights, as determined via the relative solution viscosity in $CH_2Cl_2$ at 25° C. and at a concentration of 0.5 g per 100 ml $CH_2Cl_2$) in the range from 10,000 to 200,000 and preferably in the range from 30,000 to 70,000 which correspond to formula (III):

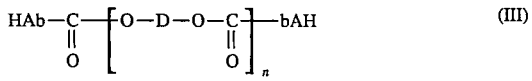

(III)

in which HAb is the hydrogenated residue corresponding to formula (Ia), —D— is the two-bond group of formula (II) and "n" is the degree of polymerization resulting from the weight average molecular weights $\overline{M}w$ in the range from 10,000 to 200,000 and preferably in the range from 30,000 to 70,000.

Preferred carbonate donors are phosgene and diphenyl carbonate and also the bis-chlorocarbonic acid esters of the diphenols to be used and the bisphenyl carbonates of the diphenols to be used.

Suitable branching agents are used in small quantities, preferably in quantities of 0.05 to 2.0 mole-%, based on moles of diphenols used, and include trifunctional or more than trifunctional compounds, more particularly those containing three or more than three phenolic hydroxyl groups. Some of the compounds containing three or more than three phenolic hydroxyl groups which may be used in accordance with the invention are, for example, phloroglucinol, 4,6-dimethyl-2,4,6-tri-(4-hydroxyphenyl)-hept- 2-ene, 4,6-dimethyl-2,4,6-tri-(4-hydroxyphenyl)-heptane, 1,3,5-tri-(4-hydroxyphenyl)benzene, 1,1,1-tri-(4-hydroxyphenyl)-ethane, tri-(4-hydroxyphenyl)-phenylmethane, 2,2-bis-(4,4-bis-(4-hydroxyphenyl)-cyclohexyl)-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)orthoterephthalic acid ester, tetra-(4-hydroxyphenyl)methane, tetra-(4-(4-hydroxyphenylisopropyl)-phenoxy)methane and 1,4-bis-((4',4"-dihydroxytriphenyl)-methyl)benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

The conditions of the interfacial process, solvent, aqueous alkaline phase, catalyst, temperature, pressure, working up, are the known conditions usually applied. The same applies to the homogeneous phase process (pyridine process).

The conditions of the melt transesterification process, temperature control, adjustment of the reaction pressures, type and addition time of the catalysts and reactor types, are likewise the usual conditions.

The polycarbonates according to the invention are preferably produced by the interfacial process (cf. H. Schnell, "Chemistry and Physics of Polycarbonates", Polymer Reviews, Vol. IX, pages 33 et seq., Interscience Publ., 1964). To this end, the diphenols, preferably corresponding to formula (II), are dissolved in aqueous/alkaline phase. The quantities of hydrogenated abietic acid required for the production of the polycarbonates according to the invention, dissolved in an organic solvent, are then added to the resulting solution. The solution is then reacted with phosgene by the interfacial condensation method in the presence of an inert, preferably polycarbonate-dissolving organic phase. The reaction temperature is in the range from 0° to 40° C.

The 0.05 to 2 mole-% (based on moles of diphenols used) of branching agents optionally used may either be initially introduced with the diphenols in the aqueous/alkaline phase or may be added with the chain terminators dissolved in the organic solvent before the phosgenation step.

Instead of the diphenols to be used, mono- and/or bis-chlorocarbonic acid esters thereof may also be used, being added in the form of solutions in organic solvents. In this case, the quantity of chain terminators and branching agents is determined by the moles of diphenolate structural units, i.e. for example —O—D—O—. Where chlorocarbonic acid esters are used, the quantity of phosgene may be correspondingly reduced in known manner.

However, the hydrogenated abietic acid may also be initially introduced together with the diphenols in the aqueous/alkaline phase at the beginning of the reaction or even in the form of a solution in an organic solvent during the phosgenation process. Suitable organic solvents for dissolving the hydrogenated abietic acid and, optionally, for the branching agents and the chlorocarbonic acid esters are, for example, methylene chloride, chlorobenzene, acetone, acetonitrile and mixtures of these solvents, more particularly mixtures of methylene chloride and chlorobenzene.

Methylene chloride, chlorobenzene and mixtures of methylene chloride and chlorobenzene, for example, may be used as the organic phase for the interfacial polycondensation reaction.

The production of the polycarbonates according to the invention by the interfacial method may be catalyzed in the usual way by such catalysts as tertiary amines, more particularly tertiary aliphatic amines, such as tributylamine or triethylamine. The catalysts may be used in quantities of 0.05 to 10 mole-%, based on moles of diphenols used or on moles of diphenolate structural units used. The catalysts may be added before, during or even after the phosgenation reaction.

The polycarbonates according to the invention are isolated in known manner.

The polycarbonates according to the invention may contain the additives typical of polycarbonates in the usual quantities, i.e. for example stabilizers, fillers, mold release agents, pigments and/or flameproofing agents. They may be added in known manner during or after production of the polycarbonates.

The polycarbonates according to the invention may be processed in known manner to form moldings of any kind by extrusion or injection molding in known processing machines.

The polycarbonates according to the invention and the moldings produced from them are distinguished by the favorable combination of properties mentioned at the beginning.

The process according to the invention for the production of the aromatic polycarbonates terminated by the groups corresponding to formula (I) may also be extended to the production of aromatic polyester carbonates by partial replacement of the carbonate donors by reactive aromatic dicarboxylic acid derivatives, preferably by aromatic dicarboxylic acid dichlorides or aromatic dicarboxylic acid dimethyl esters, depending on whether the process is carried out in solution (interfacial process, pyridine process) or in the melt.

Accordingly, the present invention also relates to the use of hydrogenated abietic acid as chain terminator for the production of thermoplastic aromatic polyester carbonates.

Accordingly, the present invention also relates to a process for the production of thermoplastic aromatic polyester carbonates from diphenols, carbonate donors, reactive aromatic dicarboxylic acid derivatives, chain terminators and optionally branching agents by the known interfacial, homogeneous solution or melt transesterification method, characterized in that hydrogenated abietic acid, preferably tetrahydroabietic acid, is used as chain terminator in quantities of 0.6 to 12 mole-% and preferably in quantities of 2 to 7 mole-%, based on moles of diphenols used.

Reactive aromatic dicarboxylic acid derivatives are those which react bifunctionally under the polycarbonate production conditions. As already mentioned, the diacid dichlorides and diacid dimethyl esters are preferred.

Preferred aromatic dicarboxylic acids are isophthalic acid and terephthalic acid and mixtures thereof and preferred derivatives thereof, such as dichlorides and dimethyl esters.

The foregoing observations on the production of the polycarbonates according to the invention apply in regard to the diphenols, carbonate donors and branching agents to be used and the reaction conditions to be applied.

The polyester carbonates according to the invention are preferably produced by the interfacial process as described for the production of the corresponding polycarbonates, the phosgene being partly replaced by aromatic dicarboxylic acid dichlorides.

The ratio of carbonate donor to reactive aromatic dicarboxylic acid derivative may vary within wide limits, preferably up to 40 mole-%, based on the total moles of carbonate donor+dicarboxylic acid derivative, being replaceable by the reactive aromatic dicarboxylic acid derivatives, depending on the extent to which the polycarbonates according to the invention are to be modified to show even greater heat resistance.

Accordingly, the present invention also relates to the aromatic polyestercarbonates obtainable by the process according to the invention with average molecular weights $\overline{M}w$ (weight averages determined as described above) in the range from 10,000 to 200,000 and preferably in the range from 30,000 to 70,000.

The present invention also relates to thermoplastic, aromatic, optionally branched polyester carbonates with weight average molecular weights $\overline{M}w$ (determined as described above) in the range from 10,000 to 200,000 and preferably in the range from 30,000 to 70,000 terminated by groups corresponding to formula (I).

The polyester carbonates according to the invention show increased heat resistance and increased notched impact strength at low temperatures. The material is transparent and thermally stable like standard polycarbonate.

The foregoing observations on the polycarbonates according to the invention apply in regard to isolation, incorporation of additives and thermoplastic processing.

The polycarbonates according to the invention and the polyester carbonates according to the invention are used for medical applications, preferably for any medical applications involving sterilization with superheated steam, for optical applications and for storing information.

In addition, the polycarbonates according to the invention may be used with advantage for any applications requiring relatively high heat resistance.

EXAMPLES

Example 1

22.8 g of bisphenol A, 0.918 g of hydrogenated abietic acid, 39.11 g of 45% NaOH and 270 ml of dichloromethane are introduced at room temperature into a 1 liter four-necked wave-breaking flask. 16 g of phosgene are introduced and, after the addition of 0.11 ml of N-ethyl piperidine, the contents of the flask are stirred for 45 minutes. The reaction mixture is then acidified with dilute HCl, the organic phase is removed and washed free from ions. Drying and concentration leave 25.2 g of a product having a relative viscosity of 1.28 (0.5% in dichloromethane). The polycarbonate terminated with hydrogenated abietic acid has a heat resistance (Vicat B softening temperature) of 155° C. and a tough/brittle transition at −20° C. in the notched impact strength test. The product is transparent and edge-free and does not discolor on heating to 280° C. (2 minutes under nitrogen).

Comparison Example a

A polycarbonate with a relative solution viscosity of 1.28 produced with phenol as chain terminator by the interfacial method described in Example 1 has a heat resistance (Vicat B softening temperature) of 149° C. and a tough/brittle transition between 0° C. and −10° C. in the notched impact strength test.

Comparison Example b

As Example 1 above, except that non-hydrogenated abietic acid is used instead of the hydrogenated abietic acid.

The procedure was as in Example 1, except that non-hydrogenated abietic acid (0.912 g) was used instead of the hydrogenated abietic acid. The product obtained had a relative solution viscosity of 1.28 and a heat resistance (Vicat B softening temperature) of 155° C. However, the product was yellowish in color and turned brown on heating to 80° C. (2 minutes under nitrogen).

We claim:

1. Thermoplastic aromatic polycarbonates prepared from diphenols, carbonate donors, chain terminators and optionally branching agents by an interfacial, homogenous solution or melt transesterification process, which are chain terminated with hydrogenated abietic acid in quantities of 0.6 to 12 mole-%, based on diphenols.

2. Polycarbonates as claimed in claim 1, wherein the groups terminating the polycarbonates have the formula (I):

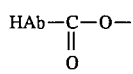     (I)

in which HAb is the hydrogenated residue corresponding to formula (Ia) and/or formula (Ib):

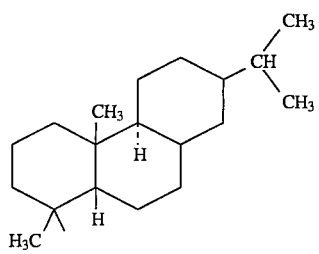     (Ia)

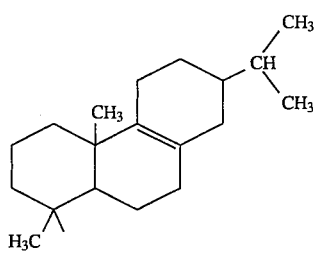     (Ib)

3. Polycarbonates as claimed in claim 1, wherein the hydrogenated abietic acid is tetrahydroabietic acid.

4. Polycarbonates as claimed in claim 1, having an average molecular weight of 10,000 to 200,000.

5. Polycarbonates as claimed in claim 4, having an average molecular weight of 30,000 to 70,000.

6. Thermoplastic aromatic polyestercarbonates prepared from diphenols, carbonate donors, reactive aromatic dicarboxylic acid derivatives, chain terminators and optionally branching agents by an interfacial, homogenous solution or melt transesterification process, which are chain terminated with hydrogenated abietic acid in quantities of 0.6 to 12 mole-%, based on diphenols.

7. Thermoplastic aromatic polyestercarbonates as claimed in claim 6, wherein the groups terminating the polyestercarbonates have the formula (I):

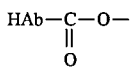     (I)

in which HAb is the hydrogenated residue corresponding to formula (Ia) and/or formula (Ib):

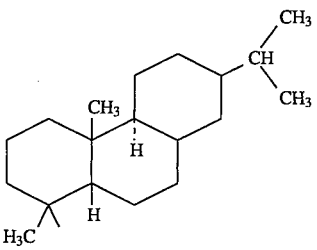     (Ia)

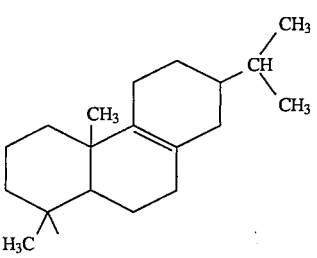     (Ib)

8. Polyestercarbonates as claimed in claim 6, wherein the hydrogenated abietic acid is tetrahydroabietic acid.

9. Polyestercarbonates as claimed in claim 6, having an average molecular weight of 10,000 to 200,000.

10. Polyestercarbonates as claimed in claim 9, having an average molecular weight of 30,000 to 70,000.

11. Aromatic polycarbonates of the formula (III):

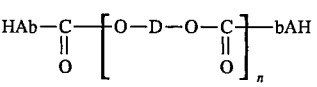     (III)

in which Hab is a hydrogenated residue of the formula (Ia):

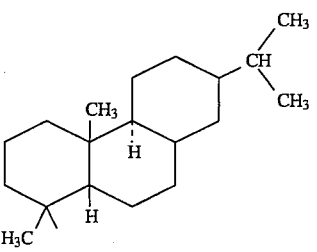     (Ia)

and —D— is a diphenyl residue and n is the degree of polymerization, the degree of polymerization yielding a weight average molecular weight of 10,000 to 200,000.

12. Aromatic polycarbonates as claimed in claim 11, having a weight average molecular weight of 30,000 to 70,000.

* * * * *